United States Patent [19]

Gantzer

[11] Patent Number: 5,406,995
[45] Date of Patent: Apr. 18, 1995

[54] CONTAINER ASSEMBLY FOR MIXING LIQUIDS IN PREDETERMINED RATIOS

[75] Inventor: Charles J. Gantzer, South Beloit, Ill.

[73] Assignee: Viking Industrial Products, Inc., South Beloit, Ill.

[21] Appl. No.: 174,377

[22] Filed: Dec. 28, 1993

[51] Int. Cl.$^6$ .......................................... B01F 13/00
[52] U.S. Cl. .................................... 141/325; 141/100; 141/332; 141/382; 366/341; 137/576; 220/86.2; 220/502; 73/429; 73/426
[58] Field of Search ...................... 141/9, 95, 100, 105, 141/324–326, 331–333, 337–342, 382; 366/341; 73/426–429; 220/86.2, 501, 502, 506; 137/576

[56] References Cited

U.S. PATENT DOCUMENTS

| | | | |
|---|---|---|---|
| 1,337,558 | 4/1920 | King | 141/382 |
| 1,570,010 | 1/1926 | Scowcroft, Jr. | 137/576 |
| 1,862,815 | 6/1932 | Buddenbrock | 220/86.2 |
| 2,161,060 | 6/1939 | Kelsey | 137/21 |
| 2,631,608 | 3/1953 | Rosenberg | 137/576 |
| 2,788,801 | 4/1957 | Mowat | 137/576 |
| 3,316,933 | 5/1967 | Ajero | 137/576 |
| 3,720,231 | 3/1973 | Ajero | 137/576 |
| 3,979,010 | 9/1976 | Fiedler et al. | 220/86.2 |
| 4,721,393 | 1/1988 | Kwast | 366/341 |
| 5,074,343 | 12/1991 | Tyree, Jr. | 141/331 X |
| 5,297,595 | 3/1994 | Haile et al. | 220/86.2 X |

FOREIGN PATENT DOCUMENTS 0230659 3/1925 United Kingdom ................ 141/338

*Primary Examiner*—J. Casimer Jacyna
*Attorney, Agent, or Firm*—Leydig, Voit & Mayer, Ltd.

[57] ABSTRACT

A container assembly includes an outer container and at least one inner container whose internal volume has the same ratio to the remaining internal volume of the outer container as the desired ratio of liquids to be mixed. An orifice in the inner container establishes communication between the lower end portions of the two containers so that a previously mixed liquid mixture of a predetermined ratio resides at the same level in both containers. The container assembly may be filled with additional mixture of the same ratio by filling the inner container with one liquid and by flushing that liquid from the inner container and into the outer container with a second liquid until the outer container is full.

15 Claims, 6 Drawing Sheets

CONTAINER ASSEMBLY FOR MIXING LIQUIDS IN PREDETERMINED RATIOS

BACKGROUND OF THE INVENTION

This invention relates to a container assembly for holding two or more different liquids which are mixed together in a predetermined ratio. The container assembly may, for example, be a can or a tank adapted to hold a mixture of gasoline and two cycle motor oil mixed in a predetermined ratio for use in two cycle engines. Alternatively, liquids such as pesticides and/or herbicides may be mixed in a predetermined ratio with water.

A problem arises when a container is partially filled with a mixture of properly proportioned liquids and there is a desire or need to completely fill the container with liquids of the same proportions. Since the quantity of the mixture remaining in the container generally is unknown, it is difficult to determine the additional amount of mixture that must be prepared in order to fill the container. Moreover, the liquids usually must be measured separately in a second container for subsequent transfer to the main container.

SUMMARY OF THE INVENTION

The general aim of the present invention is to provide a new and improved container assembly which is of relatively simple and inexpensive construction and which enables automatic mixing of two or more liquids in a ratio which matches the ratio of a mixture already in the container assembly.

A more detailed object of the invention is to achieve the foregoing through the provision of a container assembly having properly proportioned inner and outer containers for receiving the different liquids in the same ratio as the mixture existing in the container assembly, this being made possible by virtue of small orifice means enabling the same mixture level to be established in the inner and outer containers prior to additional liquids being added to the containers.

A further object of the invention is to provide a container assembly in which more than two liquids may be properly proportioned with an existing mixture.

Still another object is to enable the same container assembly to be used to establish mixtures of different ratios.

An important object of the invention is to provide a proportioning container assembly which may be used with an automatic shut-off dispensing nozzle (e.g., a gasoline dispensing nozzle) and which will effect automatic shut off of the nozzle when the container assembly is filled to a predetermined level.

Another object of the invention is to provide a pull-up funnel to enable quick and easy addition of oil or other liquid to a container assembly having an obstructed and difficult to reach fill opening.

These and other objects and advantages of the invention will become more apparent from the following detailed description when taken in conjunction with the accompanying drawings.

Figures 1, 2, 3:
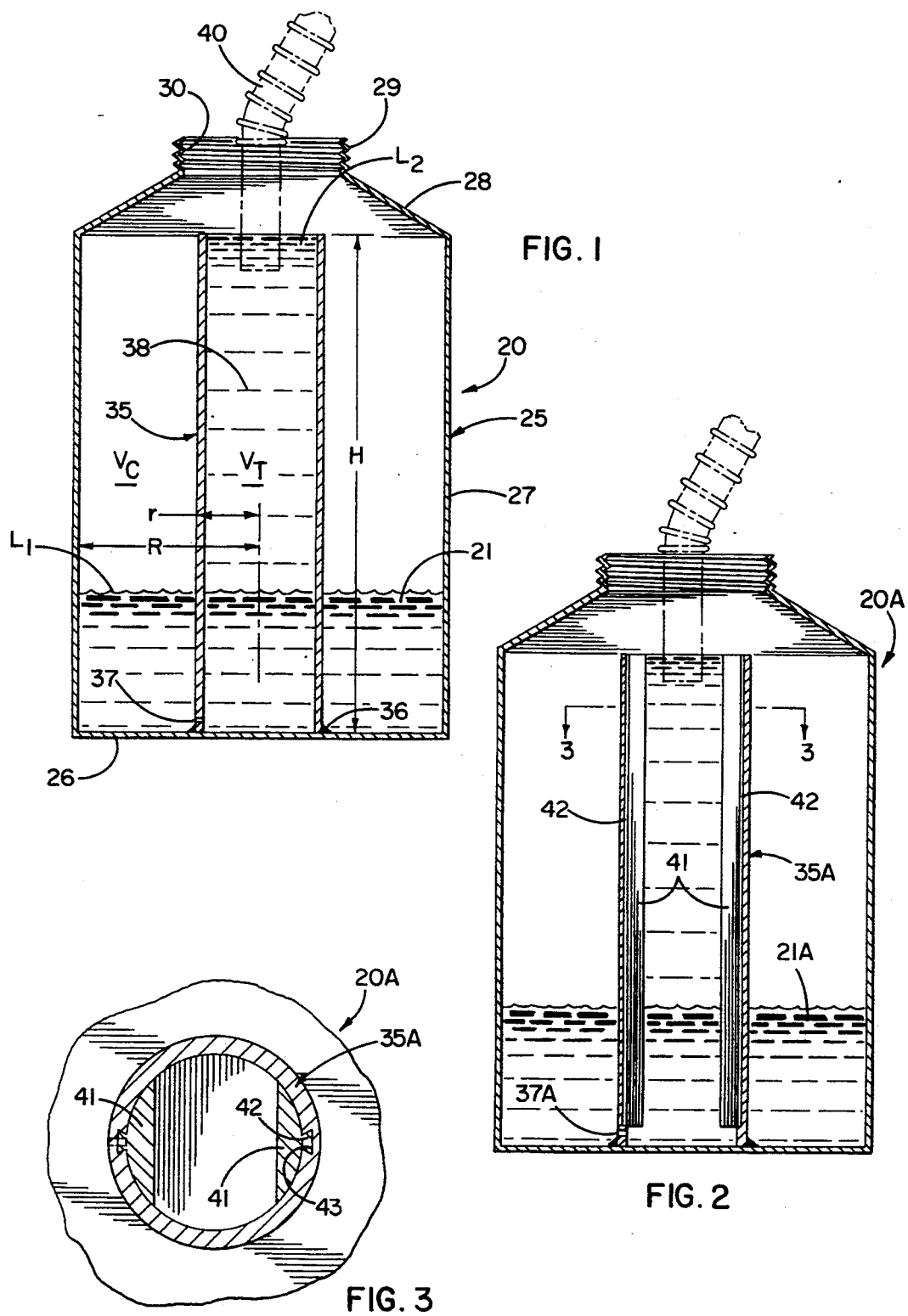
FIG. 1 is a cross-sectional view taken axially through a first embodiment of a new and improved container assembly incorporating the unique features of the present invention.
FIG. 2 is a view similar to FIG. 1 but shows a second embodiment.
FIG. 3 is an enlarged fragmentary cross-section taken substantially along the line 3—3 of FIG. 2.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as embodied in a container assembly 20 which, in the case of FIG. 1, is a can adapted to hold a mixture 21 of two different liquids. By way of example only, the mixture 21 may consist of gasoline and two cycle motor oil which are mixed together in a predetermined ratio. While the container assembly 20 has been specifically shown in the form of a can, it should be realized that the container assembly could be a tank, a vat or the like and could be either a stand-alone unit or could be incorporated in a boat, snowmobile or other apparatus.

The can 20 shown in FIG. 1 comprises an outer container 25 which herein has a flat bottom wall 26, a cylindrical side wall 27, and a frustoconical top wall 28. An internally and externally threaded neck 29 extends upwardly from the top wall and defines a fill opening 30 through which liquids may be introduced into the can 20.

In carrying out the invention, the can 20 includes an inner container 35 whose volume is substantially less than that of the outer container 25. In this particular instance, the inner container 35 is in the form of a cylindrical tube located in the center of the outer container 25 and extending vertically upwardly from the bottom wall 26 thereof to the same level as the upper end of the cylindrical side wall 27. The lower end portion of the tube 35 is secured to the bottom wall 26 by an annular weld 36 and thus the lower end of the tube is closed off by the bottom wall. The upper end of the tube is open and is aligned with the fill opening 30.

Importantly, a restricted orifice 37 is formed through the tube 35 adjacent the lower end thereof. The area of the orifice is very small in comparison to the cross-sectional area of the tube.

Of additional importance is the fact that the ratio of the internal volume of the tube 35 to the remaining internal volume of the outer container 25 as defined within the cylindrical wall 27 thereof is equal to the desired ratio of the mixture 21 in the can 20. By way of example, if the mixture 21 contains 50 parts by volume of gasoline and 1 part by volume of oil, the internal volume $V_T$ of the tube 35 is 1/50th of the volume $V_C$ where $V_C$ is equal to $\pi H(R^2 - r^2)$ with H being the height of the tube 35 and the cylindrical wall 27, with R being the internal radius of the outer container 25 and with r being the outer radius of the tube 35.

To explain use of the can 20, assume that the can is partially filled to a level $L_1$ with a mixture 21 of gasoline and oil at the desired ratio. Such mixture is contained in the outer container 25 and, because of the orifice 37, also is contained within the tube 35.

Now assume that it is desired to totally fill the can 20 with a gasoline/oil mixture of the same ratio. To effect this, oil 38 is poured through the fill opening 30 and into the inner tube 35 until the oil reaches a level $L_2$ even or approximately even with the upper end of the tube. As a result of the restricted size of the orifice 37, very little oil 38 leaks out of the tube and into the outer container 25 as oil is poured into the tube. Because of the volumetric relationship between the tube and the outer container as discussed above, the ratio of the volume of oil 38 in the tube to the unfilled volume of the outer container is equal to the ratio of the mixture 21 already in the can 20.

After the tube 35 has been filled with oil 38, a gasoline dispensing nozzle 40 is inserted into the can 20 through the fill opening 30 and is inserted a short distance into the tube. Upon opening of the nozzle, the pressurized gasoline flushes the oil 38 out of the tube and, at the same time, fills the remaining volume of the outer container 25. When the liquid level reaches the upper end of the cylindrical side wall 27, the ratio of the mixture in the filled can is equal or substantially equal to the ratio of the mixture 21 which originally existed in the partially filled can.

It will be appreciated that the same procedure can be followed to establish a mixture 21 of the predetermined ratio in the can 20 when the can is initially empty. That is, the tube 35 first is filled with oil 28 to the level $L_2$ and then the remaining volume of the outer container is filled with gasoline in the manner described above.

It will also be appreciated that the outer container 25 need not necessarily be cylindrical or of uniform cross-sectional area throughout its height as long as the inner tube 35 is appropriately shaped to maintain the proper area ratio at each increment along its height.

FIGS. 2 and 3 show a can 20A which may be modified to enable mixtures 21A of different ratios to be established. This is achieved through the provision of means for selectively changing the internal volume of a tube 35A having a lower orifice 37A. Herein, these means comprise a pair of elongated blocks 41 adapted to be inserted into and removed from the tube. Each block has been shown as being formed with a dovetail rib 42 adapted to fit slidably into a complementary groove 43 formed in the inner side of the tube. When the blocks are in place, the internal volume of the tube is decreased so as to reduce the ratio of the volume of oil (or other liquid) to the volume of gasoline. By sliding the blocks upwardly and removing the blocks from the tube, that ratio may be increased. By using blocks of different volumes, still other mixture ratios may be established.

Figure 4:
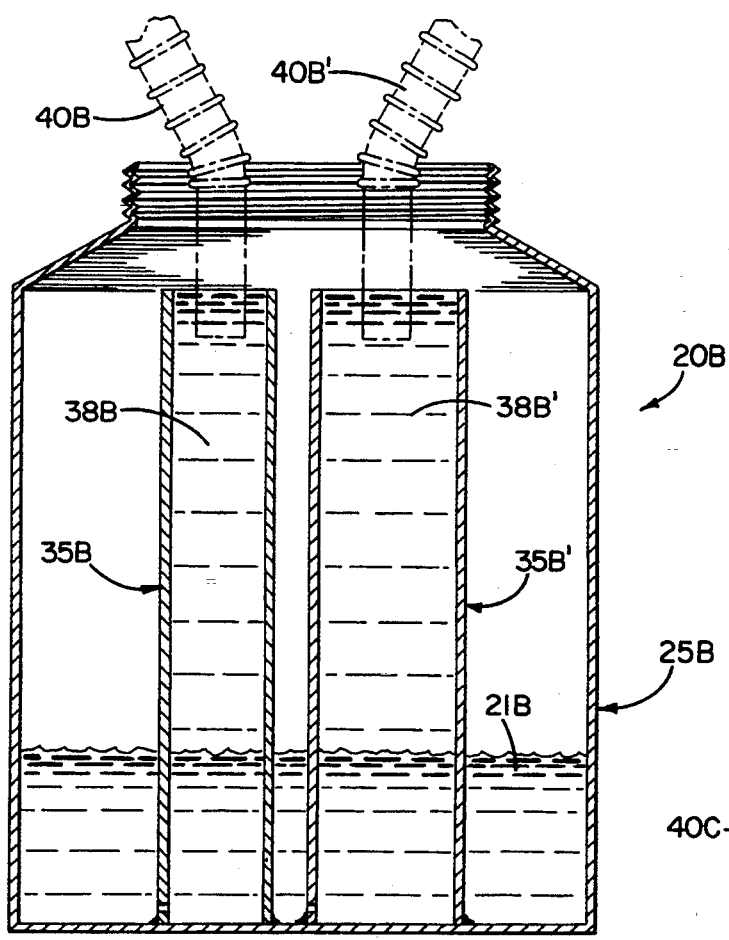
FIGS. 4, 5, 6 and 7 also are views similar to FIG. 1 but show third, fourth, fifth and sixth embodiments, respectively.

Another container assembly 20B in the form of a can or tank is shown in FIG. 4 and is adapted to establish and hold a mixture 21B of three different liquids in a predetermined ratio. The liquids could, for example, be water, a herbicide and a pesticide. In order to effect the ratioing of three liquids, two tubes 35B and 35B' which are identical to the tube 35 except for size are located in the outer container 25B. The internal volumes of the tubes 35B and 35B' are established by the remaining internal volume of the outer container 25B and by the desired ratio of the three liquids of the mixture to be established. In use, the two tubes 35B and 35B' are filled with liquids 38B and 38B' (e.g., a herbicide and a pesticide), respectively. Nozzles 40B, 40B' then are inserted into the tubes 35B, 35B' to inject water simultaneously into the tubes and to flush the liquid 38B, 38B' into the outer container 25B. When the outer container is full, the ratio of the three liquids is the same or substantially the same as the ratio of the preexisting mixture 21B.

Figure 5:
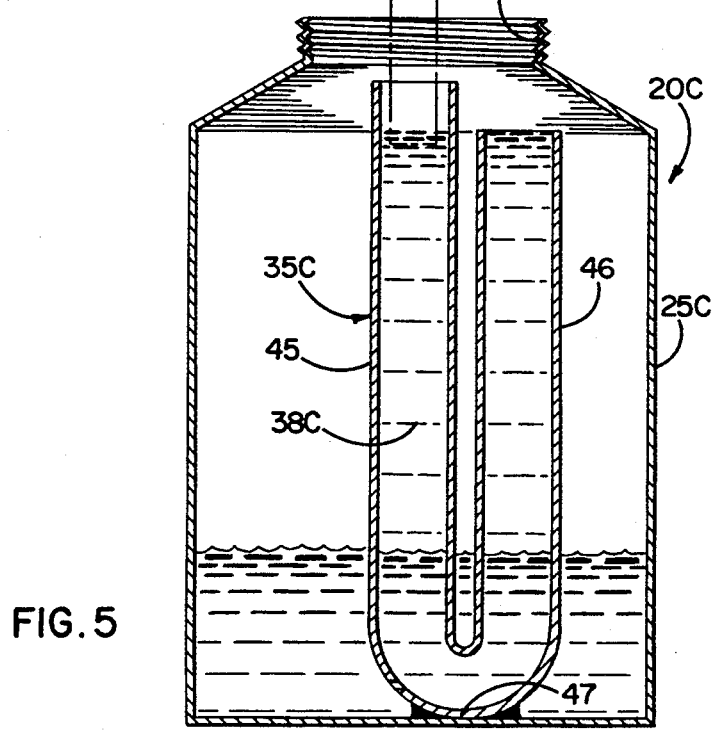

In the relatively large can 20C shown in FIG. 5, provision is made of a substantially U-shaped tube 35C. The latter includes a first upright leg 45 communicating with the fill opening 30C of the outer container 25C, a second upright leg 46 spaced laterally from the leg 45, and a generally horizontal connecting leg 47 extending between and establishing communication between the legs 45 and 46. A liquid 38C such as oil is poured into the tube 35C by way of the leg 45 until the leg 46 is full. Thereafter, a nozzle 40C is inserted into the leg 45 and gasoline is dispensed until the level within the outer container 25C reaches the upper end of the leg 46. As the gasoline is dispensed, the oil 38C is flushed out of the tube through the open upper end of the leg 46. This effects better flushing of the tube and improved mixing of the two liquids in a relatively deep can.

Figure 6:
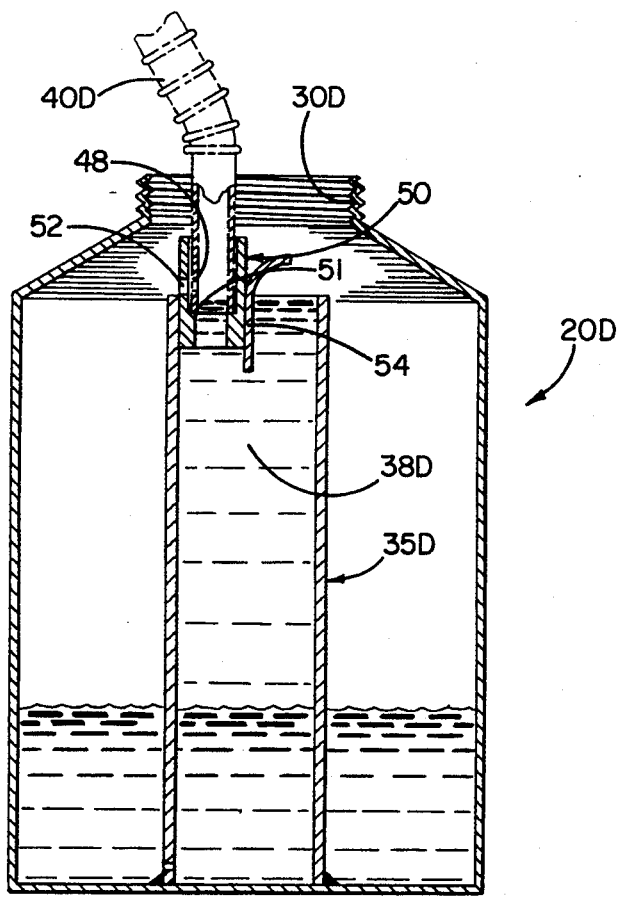

The can 20D shown in FIG. 6 is especially adapted for use with a dispensing nozzle 40D (e.g., a gasoline dispensing nozzle) having an automatic shut-off which stops the dispensing when the liquid reaches a predetermined level in the can. As is conventional, the tip end portion of such a nozzle is formed with a radially extending orifice 48 which causes the nozzle to shut off automatically when the liquid in the can 20D rises to the level of the orifice.

More specifically, the inner tube 35D of the can 20D is equipped with a nozzle holder in the form of a sleeve 50. The sleeve 50 is fixed in the upper end portion of the tube 35D and is located partially within and partially above the tube. The upper end portion of the sleeve is sized to telescopically receive the nozzle while the lower end portion of the sleeve is formed with an upwardly facing shoulder 51 which engages the lower end of the nozzle to limit further insertion of the nozzle into the sleeve. When the nozzle is positioned with its end seated against the shoulder 51, the lower end of the orifice 48 is located just above the upper end of the tube 35D.

Pursuant to the invention, the sleeve 50 is formed with a radially extending opening 52 which is aligned with the orifice 48 of the nozzle 40D when the tip of the nozzle is seated against the shoulder 51. The opening preferably is in the form of an arcuate slot formed through the sleeve and having a lower edge at the same level as the lower edge of the orifice 48.

After the tube 35D has been filled with oil 38D, the nozzle 40D is inserted into the sleeve 50 with its tip seated against the shoulder 51 and with its orifice 48 aligned axially and angularly with the slot 52. As gasoline is dispensed from the nozzle, it flushes oil out of the upper end of the tube 35D, and filling continues until the mixture reaches the level of the slot 52 and closes off the orifice 48. As an incident thereto, the nozzle is automatically shut off to indicate that the proper amount of gasoline has been dispensed into the can.

Advantageously, a deflector 54 with a curved upper end is fixed within the approximate center of the tube 35D adjacent the nozzle holder 50. As oil is flushed from the tube by the gasoline, the mixture hits the deflector and is prevented from splashing upwardly through the fill opening 30D.

Figure 7:
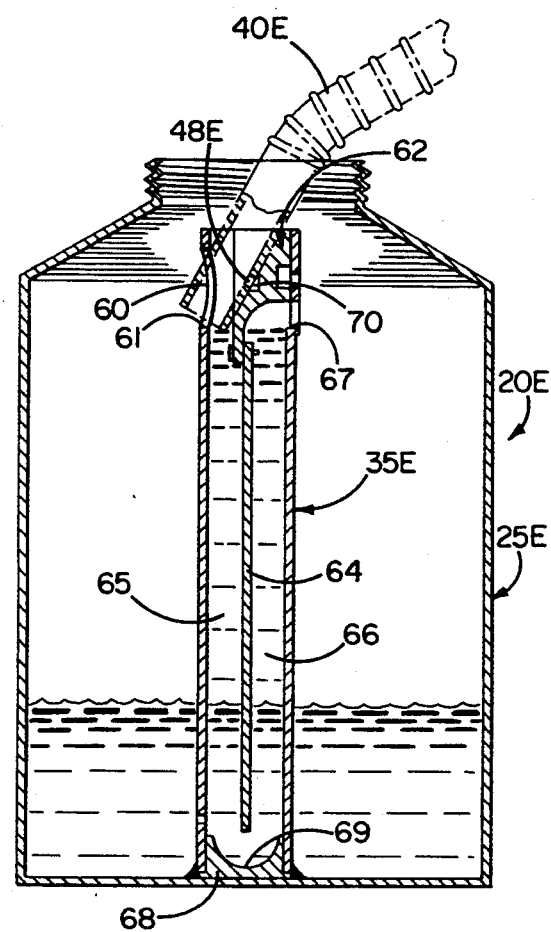
Figure 8:
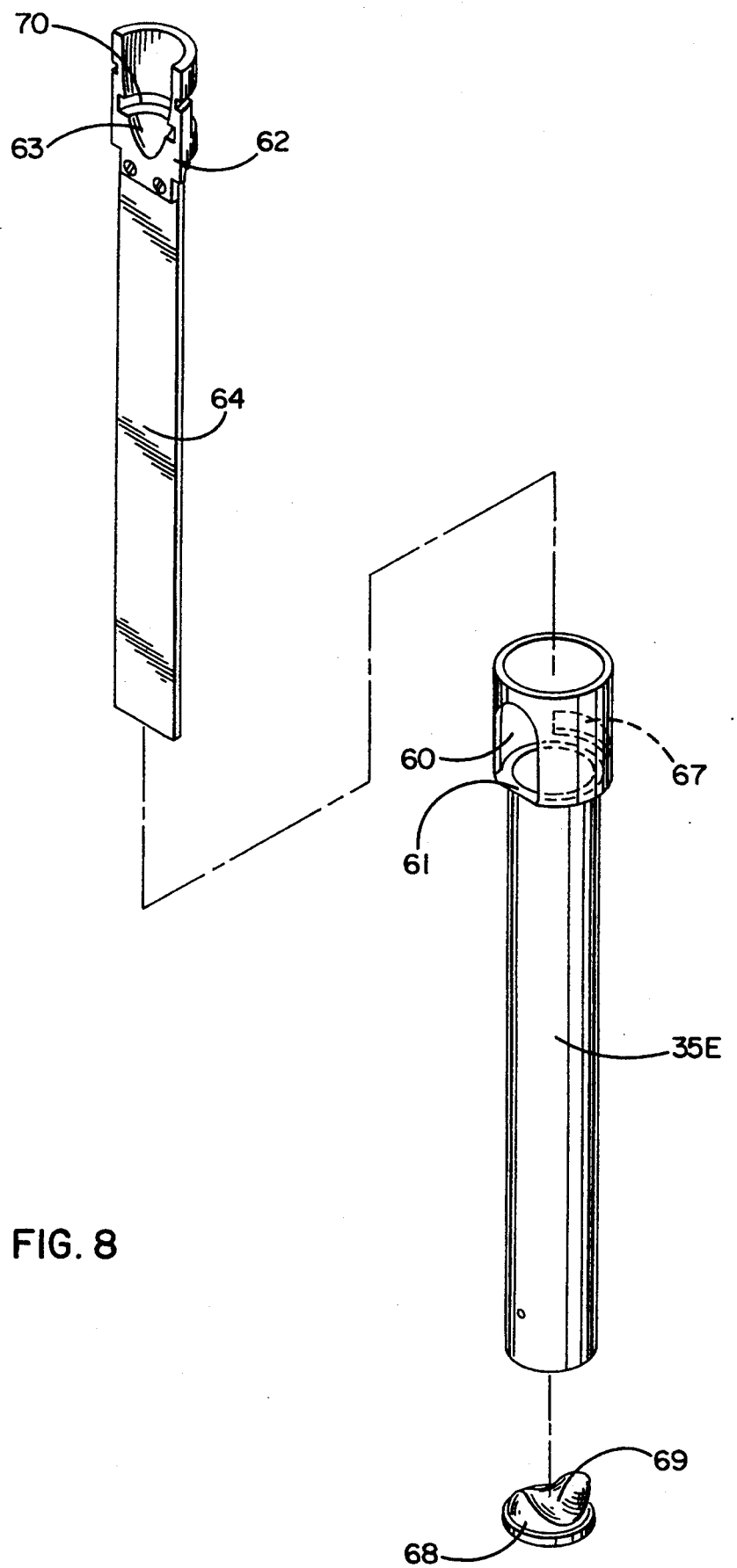
FIG. 8 is an exploded perspective view of certain components of the container assembly shown in FIG. 7.

The can 20E shown in FIGS. 7 and 8 also is designed to effect automatic shut-off of the nozzle 40E and is characterized in that only part of the gasoline (or other primary liquid) is dispensed into the tube 35E while the remainder of the gasoline is dispensed directly into the primary container 25E. Such an arrangement is particularly advantageous when the diameter of the nozzle approximates the diameter of the tube.

To achieve the foregoing, a rather large opening 60 (FIGS. 7 and 8) is formed in one side of the upper end portion of the tube 35E and includes a lower edge 61 which is adapted to support the lower end of the nozzle 40E. In addition, an insert 62 is fixed within the upper end portion of the tube diametrically opposite the opening 60 and is formed with a downwardly inclined curved surface 63 (FIG. 8) against which the nozzle is adapted to rest in an inclined position as shown in FIG. 7. When the nozzle is so disposed, approximately a portion of its dispensing opening is located so as to discharge gasoline into the tube 35E while the remainder of the dispensing opening is located to discharge gasoline through the opening 60 and directly into the outer container 25E.

Connected to and depending from the insert 62 is a sheet metal strip 64 which serves to divide the tube 35E into two compartments 65 and 66. Gasoline dispensed into the compartment 65 mixes with the oil and causes the liquid to flow out of the tube 35E by way of the compartment 66 and a port 67 formed through the upper end portion of the tube on the side thereof opposite the opening 60. As a result of the divider strip 64, the oil is flushed from the tube in a more positive and thorough manner and, because part of the gasoline is dispensed directly into the outer container 25E, the flow of gasoline may be increased and thus the time required to fill the can 20E is reduced and more thorough mixing is achieved.

To facilitate the flow of liquid from the compartment 65 to the compartment 66, a flow director 68 (FIG. 8) is located in the lower end portion of the tube 35E. The flow director is in the form of a block having a concavely curved upper surface 69 which directs the liquid to move from the compartment 65 to the compartment 66 and reduces the tendency of the liquid to backwash through the compartment 65.

In order to enable automatic shut-off of the nozzle 40E, a groove 70 (FIG. 8) is formed in the curved surface 63 of the insert 62 and is aligned angularly and axially with the orifice 48E in the nozzle 40E when the latter is positioned as shown in FIG. 7. When the level of liquid in the tube 35E reaches the level of the groove 70, liquid closes off the orifice 48E in the nozzle 40E to effect automatic shut-off of the nozzle. By properly sizing and locating the port 67, the level of liquid in the tube 35E resides at or near the top of the port during flushing of the tube. As the level in the outer container 25E reaches the bottom of the port 67, back pressure from the liquid in the outer container raises the level in the tube to cause the automatic shut-off while the level in the outer container is near the bottom of the port 67.

Figure 9:
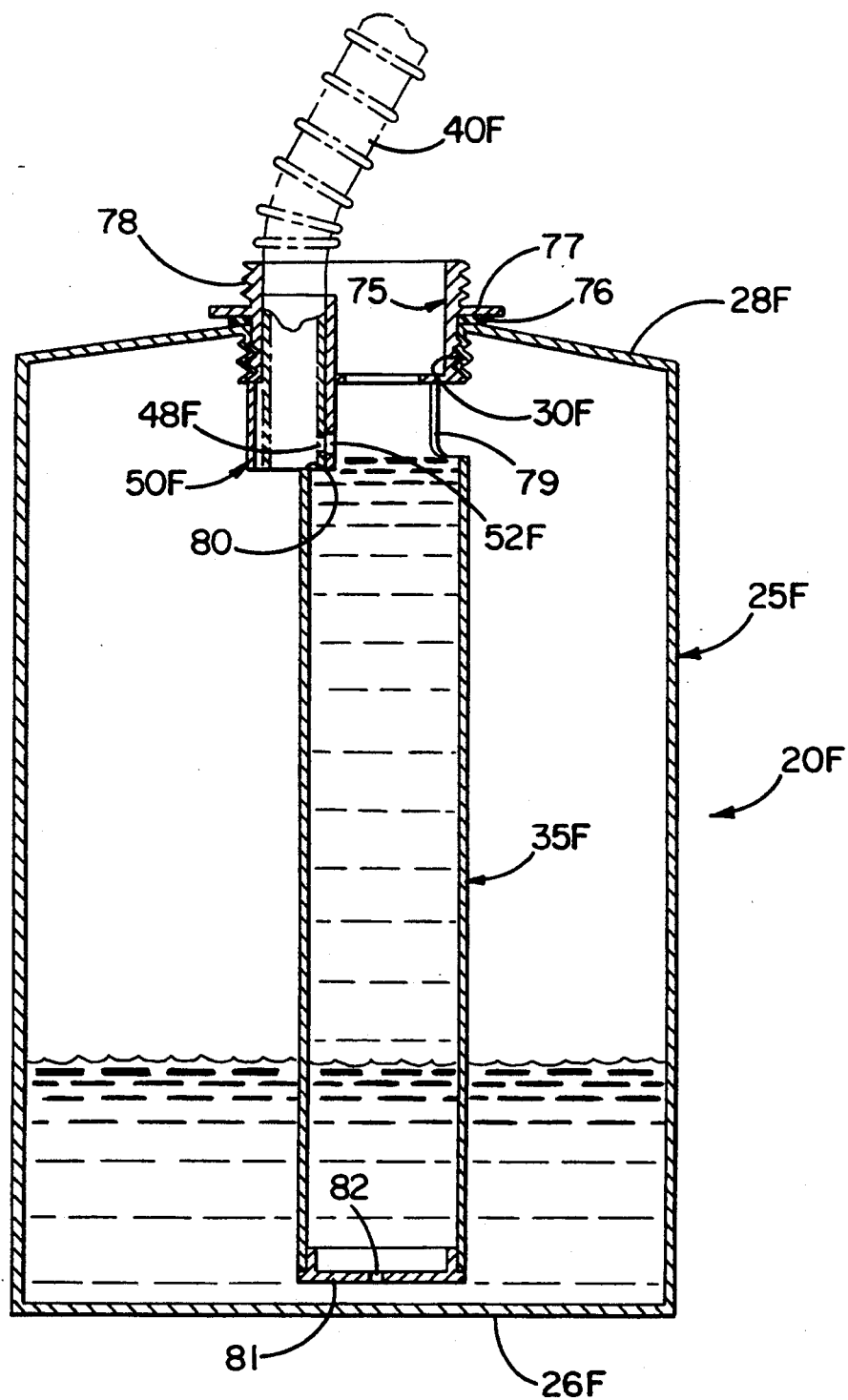
FIG. 9 is another view similar to FIG. 1 but shows a seventh embodiment.

The can 20F shown in FIG. 9 is characterized in that the tube 35F is connected to a threaded fitting 75 which is screwed into the fill opening 30F, there being a sealing gasket 76 between a flange 77 on the fitting and the top wall 28F of the outer container 25F. The upper end portion of the fitting 75 is also threaded as indicated at 78 to accommodate a screw-on cap (not shown) for closing the can 20F.

The tube 35F extends downwardly from the fitting 75 and its upper end portion is formed with an opening 79 to allow liquid to spill from the tube and into the outer container 25F. Disposed within an opening in the diametrically opposite side of the tube is a nozzle-holding sleeve 50F which receives the nozzle 40F. When the nozzle is telescoped into the sleeve, its end engages the lower edge 80 of the aforementioned opening and causes the shut-off orifice 48F in the nozzle to be aligned with an opening 52F in the sleeve so as to effect automatic shut-off of the nozzle when the liquid in the tube rises to the level of the orifice. As in the case of the nozzle 40E, the nozzle 40F is positioned so as to discharge part of the gasoline into the tube and to discharge the remaining gasoline directly into the outer container 25F.

In the can 20F, the tube 35F is spaced upwardly from the bottom wall 26F of the outer container 25F and its lower end is closed by a plug 81 having a restricted orifice 82 therein, the orifice 82 serving the same purpose as the orifice 37.

Figure 10:
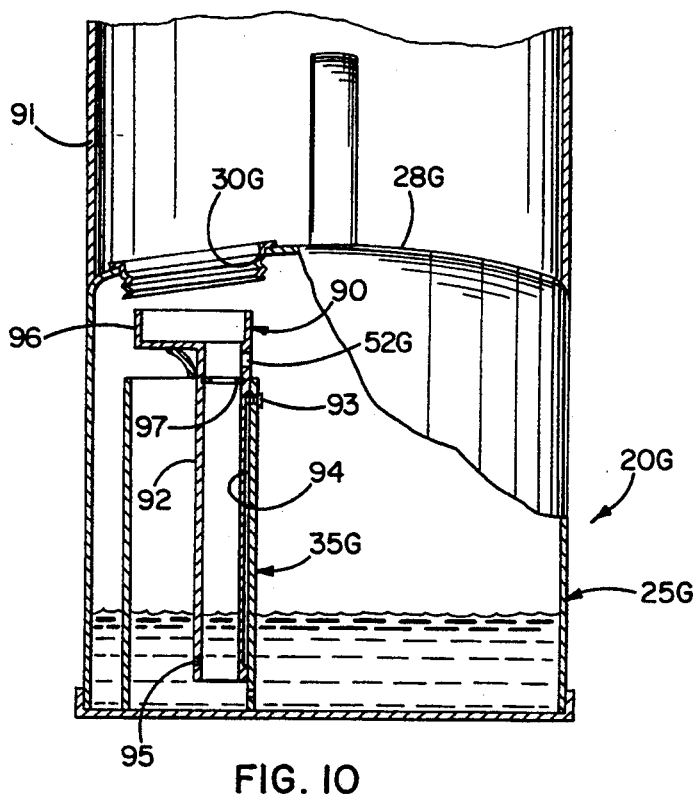
FIG. 10 is still another view similar to FIG. 1 but shows yet another embodiment.
Figure 11:
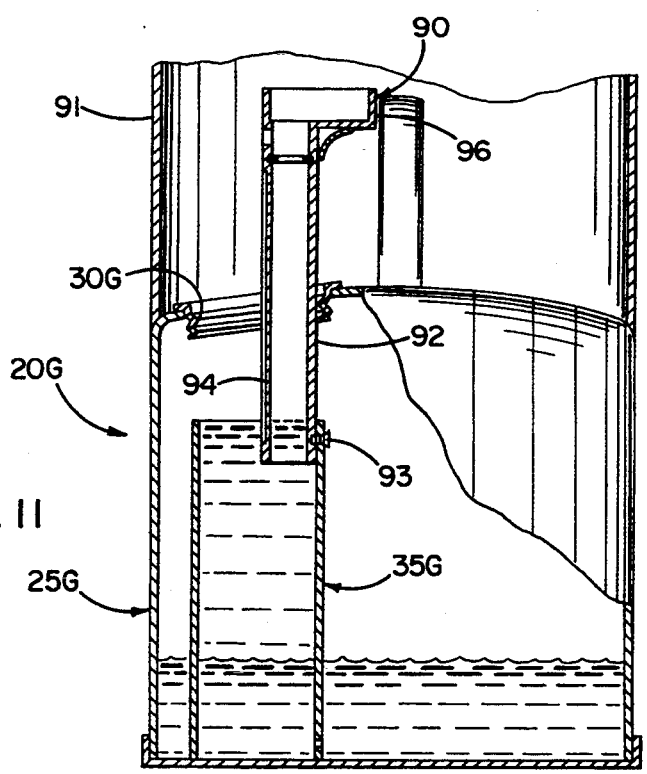
FIG. 11 is a view of the container assembly illustrated in FIG. 10 but shows certain components of the container assembly in moved positions.

A particularly advantageous can 20G is shown in FIGS. 10 and 11 and is characterized by a funnel 90 which may be pulled upwardly through the fill opening 30G to facilitate the pouring of oil or other liquid into the inner tube 35G. The funnel is particularly advantageous, for example, with a can of the type having a cylindrical member 91 extending a substantial distance above the top wall 28G. The cylindrical member 91 restricts access to the fill opening 30G and makes it difficult to add oil to the can.

The funnel 90 includes an elongated sleeve 92 which is supported to slide upwardly and downwardly within the inner tube 35G. In this instance, a screw 93 or other type of detent at the upper end portion of the tube fits into a slot 94 extending axially along the outer side of the sleeve 92 to support the latter for up and down sliding between a lowered inactive position shown in FIG. 10 and a raised active position shown in FIG. 11. When the sleeve is in its raised position, the screw enters an annular groove 95 (FIG. 10) in the lower end portion of the sleeve and enables the sleeve to be turned through 180 degrees relative to the tube.

Joined to the upper end of the sleeve 92 is an enlarged cup 96 which enables oil to be poured easily into the sleeve in order to fill the tube 35G. Normally, the cup 96 is positioned as shown in FIG. 10 and, when so positioned, is located below and is aligned with the fill opening 30G. By pulling upwardly on the cup, the latter may be raised out of the outer container 25G to a height near the upper end of the obstructing member 91. By then rotating the cup, the cup may be turned away from the obstructing member 91 and toward the center of the can 20G so as to position the cup for easy filling without vertical or radial interference from the obstructing member. After the tube 35G has been filled, the cup is turned reversely and is lowered back into the outer container, the screw 93 preventing turning of the cup and the sleeve 92 in the lowered position of FIG. 10.

The sleeve 92 includes an internal ring 97 which serves as a seat for a nozzle (not shown) and also includes an opening 52G adapted to communicate with the automatic shut-off orifice of the nozzle. Gasoline dispensing and shut-off are effected in the same manner as described in connection with the can 20D and while the funnel 90 is in its lowered position shown in FIG. 10.

I claim:

1. A container assembly for holding a mixture of at least first and second different liquids mixed in a predetermined ratio and for enabling additional quantities of said liquids to be added to said mixture in the same ratio, said container assembly comprising an outer container having a closed lower end and having an upper end with a fill opening therein, said outer container having an upright side wall extending between said upper and lower ends, said outer container being partially filled to a first level with said mixture, an inner container disposed within said outer container and having a closed lower end and an open upper end, the entirety of said inner container being spaced inwardly from said side wall of said outer container whereby said inner container coacts with said side wall to define an annular chamber which completely surrounds said inner container, the volume of said inner container being substantially less than the volume of said outer container, a fixed orifice in the lower end portion of said inner container and enabling the mixture of said chamber to flow into said inner container and to fill said inner container to said first level, the open upper end of said inner container communicating with said fill opening to enable an additional quantity of said first liquid to be introduced into said inner container via said fill opening, the cross-sectional area of said inner container being substantially greater than the cross-sectional area of said orifice whereby said first liquid may be introduced into said inner container to a second level higher than said first level, an additional quantity of said second liquid being introduced into said container assembly by way of said fill opening and at least partially by way of the open upper end of said inner container whereby said second liquid intermixes with said first liquid to fill said container assembly to a level higher than said first level with a mixture of said predetermined ratio, a nozzle holder in the upper end portion of said inner container and adapted to support a filling nozzle with an automatic shut-off, said nozzle holder telescopically receiving said nozzle and having means for limiting insertion of said nozzle into said inner container, and an opening in said nozzle holder and establishing direct communication between said nozzle holder and said outer container to enable automatic shut-off of said nozzle when liquid reaches the level of said opening.

2. A container assembly as defined in claim 1 in which said inner container comprises an upright tube located within and secured rigidly to said outer container, the lower end of said tube being closed by the closed lower end of said outer container.

3. A container assembly as defined in claim 1 further including means detachably secured to the inside of said inner container and selectively removable therefrom to increase the effective volume of said inner container.

4. A container assembly as defined in claim 1 in which said inner container is defined by a substantially U-shaped tube having a first upright leg communicating with said fill opening, having a second upright leg spaced laterally from said first leg, and having a generally horizontal connecting leg extending between and establishing communication between said first and second legs, said second leg having an open upper end to permit said first liquid to be introduced into said second leg to said second level.

5. A container assembly as defined in claim 1 in which said inner container is a tube and in which said nozzle holder is a sleeve, the cross-sectional area of said sleeve being substantially less than the cross-sectional area of the upper end portion of said tube, said sleeve being located immediately adjacent the inner side of said tube.

6. A container assembly as defined in claim 5 further including a deflector located in the upper end portion of said tube in the approximate center thereof, said deflector having an outer end portion for preventing liquid spilling out of the upper end of said tube from splashing upwardly through said fill opening.

7. A container assembly as defined in claim 1 in which said nozzle holder causes part of said nozzle to be located inside of said inner container in communication therewith and part of said nozzle to be located outside of said inner container and within said outer container in communication therewith whereby part of said second liquid is introduced by said nozzle into said inner container while the remainder of said second liquid is introduced directly into said outer container.

8. A container assembly as defined in claim 7 further including a divider connected to said nozzle holder and extending downwardly into said inner container to form first and second compartments in said inner container, said divider permitting communication between said first and second compartments near the lower end of said inner container.

9. A container assembly as defined in claim 8 further including means located in the lower end of said inner container below said divider and facilitating the flow of liquid from said first compartment to said second compartment.

10. A container assembly as defined in claim 1 in which said fill opening is internally threaded, an externally threaded fitting screwed into said fill opening, said inner container being secured to and depending from said fitting.

11. A container assembly as defined in claim 1 further including a funnel having upper and lower ends, means supporting said funnel in said inner container for movement between an inactive lowered position and an active raised position, the lower end portion of said funnel being located in said inner container in both positions of said funnel, the upper end portion of said funnel being located inside of said outer container when said funnel is in said lowered position, the upper end portion of said funnel extending through said fill opening and being located outside of said outer container when said funnel is in said raised position.

12. A container assembly as defined in claim 11 further including coacting means on said funnel and one of said containers for releasably holding said funnel in said raised position.

13. A container assembly as defined in claim 11 in which said nozzle holder is defined by the upper end portion of said funnel.

14. A container assembly as defined in claim 1 for holding a mixture of at least first, second and third different liquids mixed in a predetermined ratio and for enabling additional quantities of said liquids to be added to said mixture in the same ratio, said container assembly including a second inner container disposed inside of said outer container and outside of said one inner container, said second inner container having a closed lower end and an open upper end, the volume of said second inner container being substantially less than the volume of said outer container, a fixed orifice in the lower end portion of said second inner container and enabling the mixture in said outer container to fill said second inner container to said first level, the open upper end of said second inner container communicating with said fill opening to enable an additional quantity of a third liquid to be introduced into said second inner container via said fill opening, and the cross-sectional area of the open upper end of said second inner container being substantially greater than the cross-sectional area of the orifice therein whereby said third liquid may be introduced into said second inner container to a level higher than said first level.

15. A container assembly as defined in claim 14 in which each of said inner containers comprise an upright tube located within and secured rigidly to said outer container, the lower end of each tube being closed by the closed lower end of said outer container.

* * * * *